United States Patent [19]
Musasa et al.

[11] Patent Number: 5,607,605
[45] Date of Patent: Mar. 4, 1997

[54] LASER WELDING DEVICE, A METHOD OF CHECKING WELDING CONDITION AND A METHOD OF MAKING A CENTER ELECTRODE FOR A SPARK PLUG

[75] Inventors: Mamoru Musasa; Wataru Matsutani, both of Nagoya, Japan

[73] Assignee: NGK Spark Plug Co., Ltd., Nagoya, Japan

[21] Appl. No.: 499,217

[22] Filed: Jul. 7, 1995

[30] Foreign Application Priority Data

Jul. 8, 1994 [JP] Japan ................ 6-180711

[51] Int. Cl.$^6$ ................ B23K 26/00
[52] U.S. Cl. ................ 219/121.64; 219/121.63; 219/121.83
[58] Field of Search ............ 219/121.63, 121.64, 219/121.85

[56] References Cited

U.S. PATENT DOCUMENTS

| | | | |
|---|---|---|---|
| 5,320,569 | 6/1994 | Oshima et al. | 219/121.64 |
| 5,329,091 | 7/1994 | Bissinger | 219/121.83 |
| 5,395,273 | 3/1995 | Matsutani | 219/121.64 |
| 5,446,257 | 8/1995 | Sakamoto et al. | 219/121.83 |
| 5,478,265 | 12/1995 | Matsutani et al. | 219/121.64 |
| 5,486,677 | 1/1996 | Maischner et al. | 219/121.83 |

FOREIGN PATENT DOCUMENTS

| | | | |
|---|---|---|---|
| 0504850 | 9/1992 | European Pat. Off. . | |
| 0575163 | 12/1993 | European Pat. Off. . | |
| 266522 | 4/1989 | Germany | 219/121.83 |
| 4313287 | 10/1994 | Germany | 219/121.83 |
| 59-212184 | 12/1984 | Japan . | |

OTHER PUBLICATIONS

Laser und Optoelektronik, vol. 22, No. 6, 1 Oct. 1990, pp. 56–62, XP 000175758.
Applied Optics, vol. 29, No. 12, 20 Apr. 1990, pp. 1718–1720, XP 000125244.

*Primary Examiner*—Geoffrey S. Evans
*Attorney, Agent, or Firm*—Sughrue, Mion, Zinn, Macpeak & Seas

[57] ABSTRACT

In a laser welding member, a photographing device is provided to photograph plasma caused by exposing laser beams to an object. An image processing member is provided to measure at least one of an area and height of a plasma image photographed by the photographing member. A distinction member is provided to compare a value measured by the image processing member with an allowable value so as to asses the laser welding condition.

4 Claims, 13 Drawing Sheets

Plasma Image at Various Energy Levels

Welding Condition For
Pulse Laser Beams

Fig.9b

Welding Condition For
CW Laser Beams

LASER WELDING DEVICE, A METHOD OF CHECKING WELDING CONDITION AND A METHOD OF MAKING A CENTER ELECTRODE FOR A SPARK PLUG

BACKGROUND OF THE INVENTION

1. Field of the Invention

This invention relates to a laser welding device and a method of checking laser welding condition which is provided at the time of welding to monitor plasma caused by concentrically irradiating laser beams to an object so as to determine whether the laser welding condition is good or not.

2. Description of Prior Art

Figure 12:
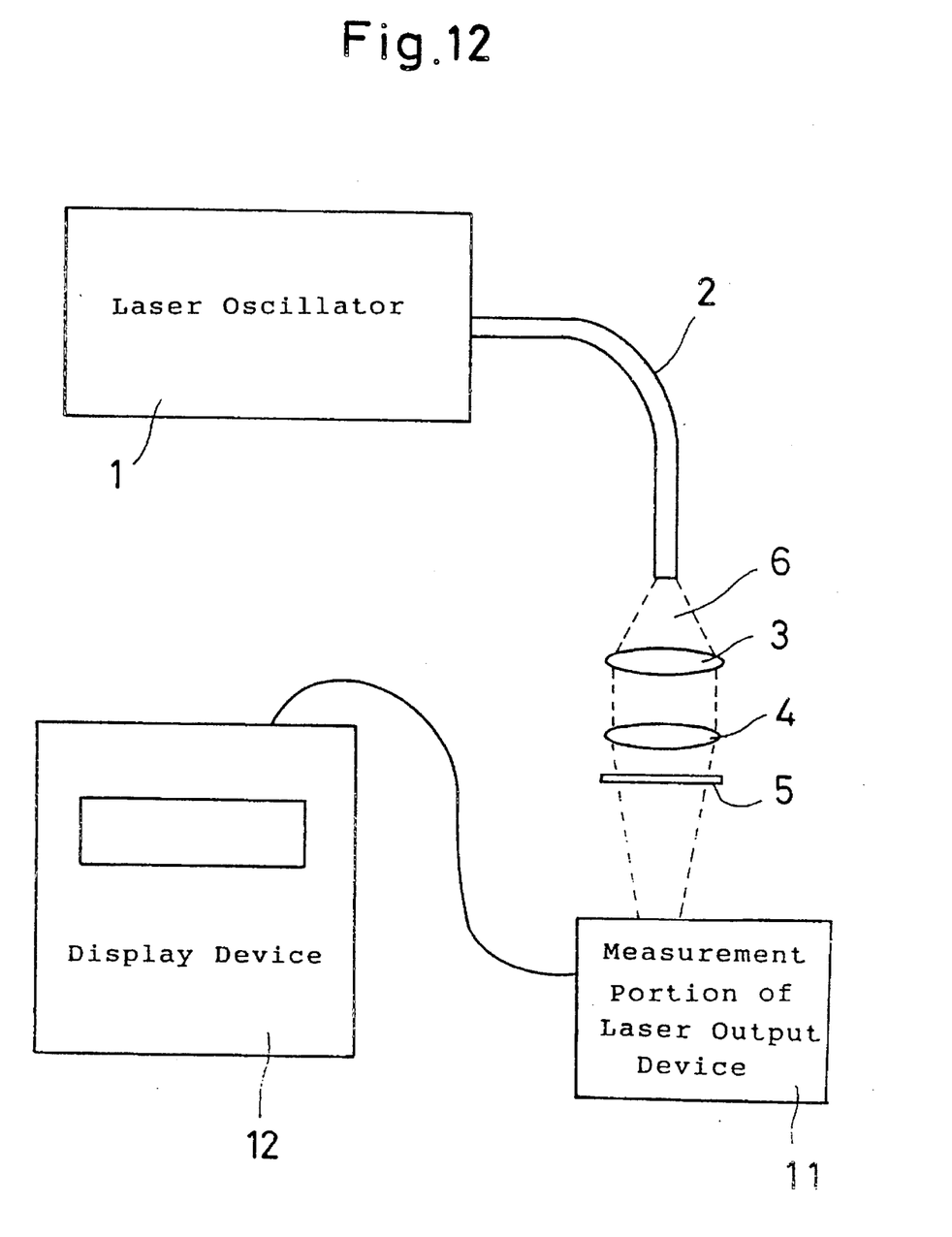
FIG. 12 is a schematic view of an output measurement system of laser beams when a laser output measurement device is used.

In laser welding technique, a laser output measurement device has been used to control energy level of laser beams generated at the time of the laser welding. FIG. 12 shows a schematic view of an energy level measuring system of laser beams with the laser output measurement device employed.

In FIG. 12, laser beams 6 generated by a laser oscillator 1 are applied on a measurement portion 11 of the laser output device through an optical fiber 2, light-converging lenses 3, 4 and a protective glass 5 so as to display an energy level of the laser beams 6 on a display device 12. An energy level value on the display device 12 makes it possible to recognize an energy intensity of the laser beams 6.

Figure 13:
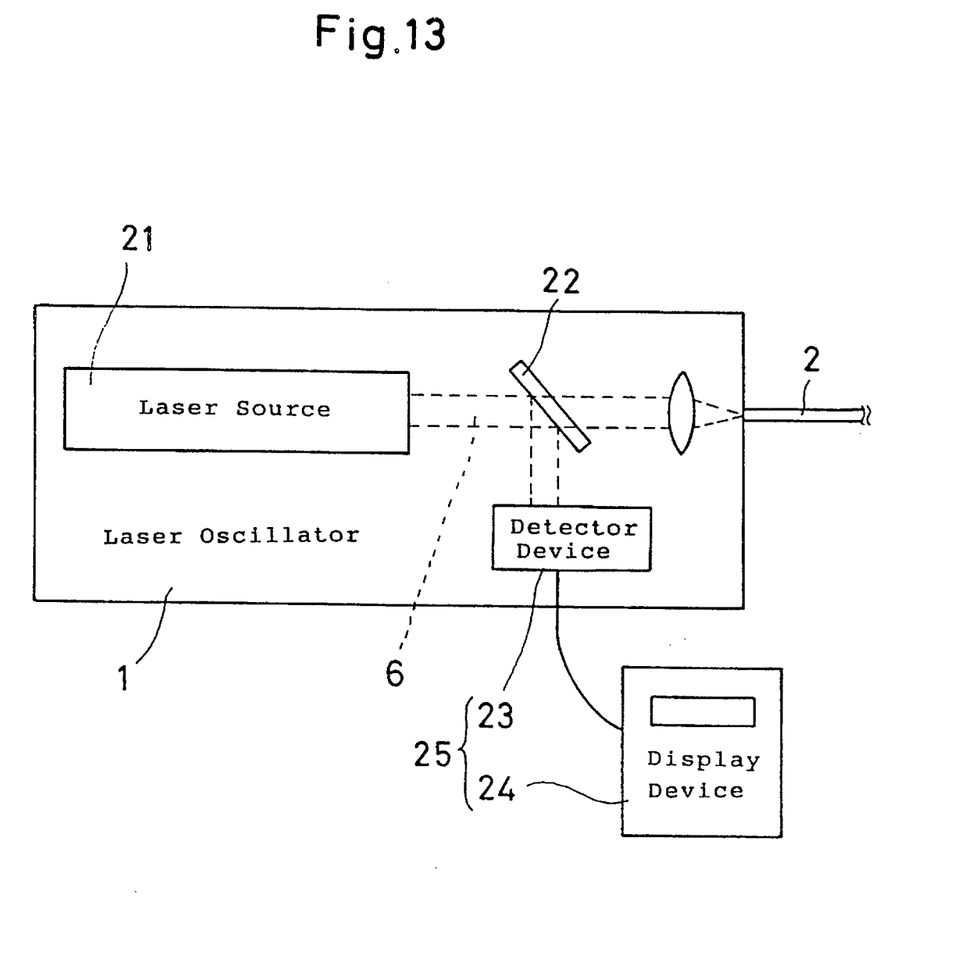
FIG. 13 is a schematic view of an energy measurement system of laser beams when a laser output monitoring device is used.

In YAG laser welding device, there is provided a laser energy monitoring member referred to as a laser output monitoring device 25 which has often been used to control an energy level of laser beams. FIG. 13 shows a schematic view of an energy level measuring system of laser beams with the laser output monitoring device 25 employed.

In FIG. 13, a part of laser beams 6 radiated from a laser source 21 of the laser oscillator 1 is passed through a semi-reflective mirror 22 to measure an energy level of the laser beams 6 by a detector 23 so as to display it on a display device 24. The detector 23 has a photodiode and a solar cell so as to recognize an energy intensity of the laser beams 6 radiated from the laser oscillator 1.

However, in the laser welding technique, even when the energy level of the laser beams 6 radiated from the laser oscillator 1 is constant, the energy level of the laser beams 6 is subject to change so as to attenuate the laser energy due to damage and stain on optic-related components such as the optical fiber 2 and the light-converging lenses 3,4 located between the laser oscillator 1 and the object. It also holds true when a distance between the laser oscillator 1 and the object is subject to change so as to vary the laser energy density at the time of replacing the objects or the like.

Since the laser output measurement device is normally used before and after the laser welding operation so as to confirm whether or not the energy level of the laser beams 6 is subjected to change by comparing the energy level before the laser welding operation and the one after the laser welding operation, it is difficult to use the laser output measurement device concurrently during the laser welding operation.

In the laser output monitoring device 25 which serves as an output value measuring device of the laser oscillator 1, the device remains immune to positional changes of the optical fiber and the light-converging lenses 3,4, and the device has no direct relation to measuring the laser energy level of the welding portion on which the laser beams 6 are applied.

In both the laser output measurement device and the laser output monitoring device 25, therefore, it is impossible to detect the welding condition of the object on which the laser beams 6 are applied.

This necessitates to frequently carry out a sampling inspection for breaking test, X-rays photographing and chemical analysis so as to increase the number of manufacturing steps. When the product is inspected as defect during the sampling operation, all the rest of the product lot have to be rejected, thus adding an unnecesary step during the manufacturing working.

Therefore, it is one of the objects of the invention to provide laser welding device and a method of checking a welding condition which is capable of determining whether or not the welding condition is good while concurrently carrying out the welding operation.

SUMMARY OF THE INVENTION

According to one aspect of the invention, there is provided a laser welding device comprising: a photographing member provided to photograph plasma caused by irradiating laser beams to an object; an image processing member provided to measure at least one of an area and height of a plasma image photographed by the photographing member; and a distinction member provided to compare a value measured by the image processing member with an allowable value so as to determine whether the laser welding condition is good or not.

According to another aspect of the invention, there is provided a laser welding device comprising: a photographing member provided to photograph plasma caused by irradiating laser beams to an object; an image processing member provided to measure at least one of an area and height of a plasma image photographed by the photographing member; and a control member provided to control an energy level of laser beams generated by a laser oscillator depending on a difference between a value measured by the image processing member and an allowable value.

According to other aspect of the invention, there is provided a method of checking laser welding condition comprising of photographing plasma caused by irradiating laser beams to an object, and measuring at least one of an area and height of a plasma image so as to determine whether the laser welding condition is good or not.

According to still another aspect of the invention, there is provided a method of making a center electrode for a spark plug when a noble metal portion is bonded by means of a pulse laser welding, comprising of photographing plasma caused by irradiating laser beams to an object, and measuring at least one of an area and height of a plasma image so as to determine whether the laser welding condition is good or not.

These consititute a welding device, a method of checking laser welding condition and a method of making a spark plug electrode respectively, each of which is capable of determining whether the welding condition is good or not.

With the plasma caused from the welding surface of the object on which the laser spot beams are applied by the light-converging lens, the plasma is photographed by the photographing member. With the use of the image processing member, at least one of the area and height of the plasma image photographed by the photographing member is measured to determine whether the laser welding condition is good or not. This is done concurrently while carrying out the welding operation so that whether or not the laser welding condition is good is early detected. This also makes it possible to decrease the number of frequent sampling inspections to guarantee the quality of all the products so as to reduce the length of manufacturing steps.

With the plasma caused from a welding surface of the welding object on which laser spot beams are applied by a light-converging lens, the plasma is photographed by the photographing member, and at least one of the area and height of the plasma image photographed by the photographing member is measured by the image processing member. With the use of a control member provided to control an energy level of laser beams depending on a difference between a value measured by the image processing member and an allowable value, it is possible to maintain good welding condition.

By narrowing a control width of the control member, it is possible to make the welding quality of the individual products uniform so as to reduce the quality variation which leads to stablizing the products.

It is to be observed that two reasons are thought why the area or height of the plasma image is reduced. One is output reduction of the laser oscillator, and other being damage or stain on the optic-related components such as an optical fiber and light-converging lens. It is a fault with the optic-related components when the area or height of the plasma image is reduced, while the value on the laser output monitor device is corresponding to an energy level of the laser beams inherently necessary for the welding operation.

As a consequence, by comparatively controlling the area or height of the plasma image and the value on the laser output monitor device, it is possible to prevent the damage on the optic-related components due to an excessive output from the laser oscillator.

With the method of checking laser welding condition comprising of photographing plasma caused by irradiating the laser beams to the welding object, and measuring at least one of the area and height of the plasma image, it is possible to determine whether or not the laser welding condition is good concurrently while carrying out the welding operation.

With the method of making a spark plug electrode by pulse laser welding a noble metal tip, comprising of photographing the plasma caused by irradiating the laser beams to the object, and measuring at least one of the area and height of the plasma image so as to determine whether the laser welding condition is good or not, it is possible to quickly detect the welding condition.

With the use of CW laser (Continuous-Wave Gas Laser), the thermal conduction varies a penetrating depth of the welding portion due to gradual temperature rise in the neighborhood of the welding portion despite the uniform energy level of the laser beams is applied from the start until the end of the welding operation. This is remarkable particularly when a small-sized component such as a center electrode for a spark plug is used.

In this instance, it is possible to control the temperature rise so as to prevent the variation of the penetrating depth of the welding portion by alternately repeating heating and cooling operations of pulse laser beams.

The above and other objects, features and advantages of the present invention will be apparent from the following detailed description of the preferred embodiments of the invention in conjunction with the accompanying drawings.

DETAILED DESCRIPTION OF PREFERRED EMBODIMENTS OF THE INVENTION

Figure 1:
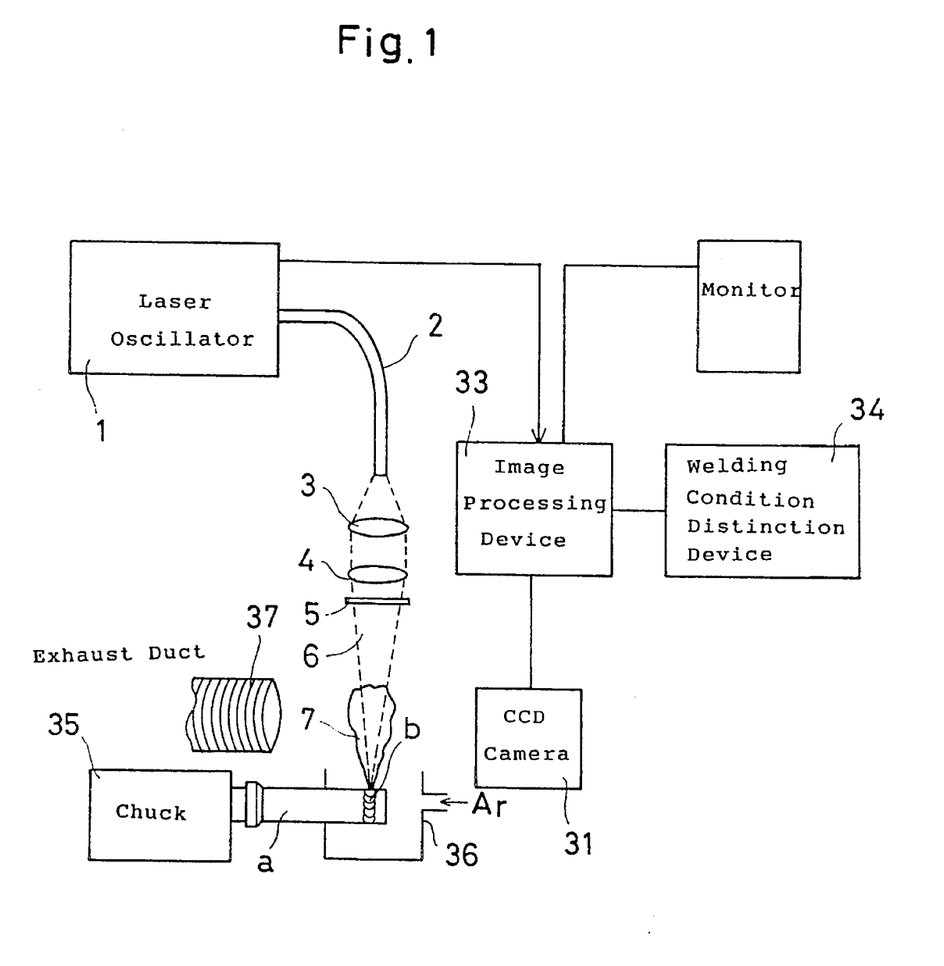
FIG. 1 is a schematic view of a welding device according to a first embodiment of the invention.

Referring to FIG. 1 which shows a welding device according to a first embodiment of the invention, laser beams 6 emitted from a laser oscillator 1 reach light-converging lenses 3, 4 by way of an optical fiber 2. The light-converging lenses 3, 4 concentrate the laser beams 6 into spot beams which are applied on an object through a protective glass 5 as described hereinafter. When the laser beams are applied on a surface of the object to be welded, plasma 7 appears from the surface of the object. A photographing device 31 only photographs the plasma 7, while an area of a plasma image taken by the photographing device 31 is to be measured by an image processing device 33.

With the use of a pulse YAG laser, it is necessary to pick up images in sync with the emission of laser beams 6. It is possible for the photographing device 31 to pick up images of the plasma 7 by using a synchronizing trigger signal which corresponds to a laser emission synchronizing signal generated from the laser oscillator 1. In this instance, a CCD camera (Charge Coupled Device) is employed with the photographing device 31.

The synchronizing trigger signal may be a trigger signal source 38 by using a photodiode which detects the laser beams 6 or plasma 7. A measurement value of an area of the plasma image is fed per pulse to a distinction device 34 which calculates an average value of all the measurement values corresponding to all the pulses required to finish the welding operation per product. By comparing the average value with an allowable value, it is determined whether or not the welding condition is good.

Figure 2:
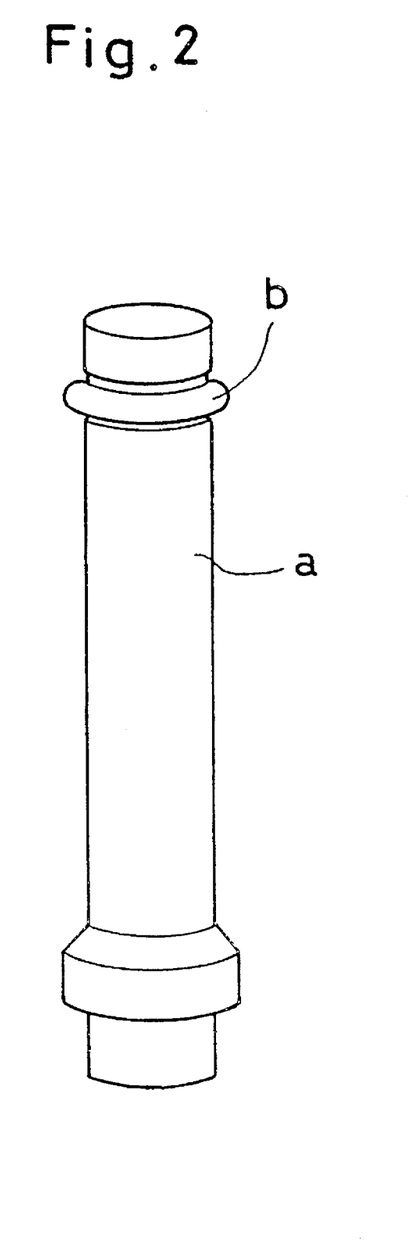
FIG. 2 is an object on which laser beams are applied in FIG. 1.

When the object is taken as a center electrode for a spark plug, FIG. 2 shows the center electrode prior to being exposed to the welding operation. An electrode metal (a) of the columnar center electrode is made of Ni-based alloy (containing 95% nickel) which has 2.0 mm in diameter. An upper portion of the electrode metal (a) has a circumferential groove to serve as a welding portion around which a wire (b) is wound. The wire (b) is made of pure platinum (Pt) having 0.3 mm in diameter. The electrode metal (a) is located by a chuck 35, and the laser beams 6 are applied on the wire (b) while rotating the electrode metal (a) at approximately 70 rpm as shown in FIG. 1.

Figure 9A:
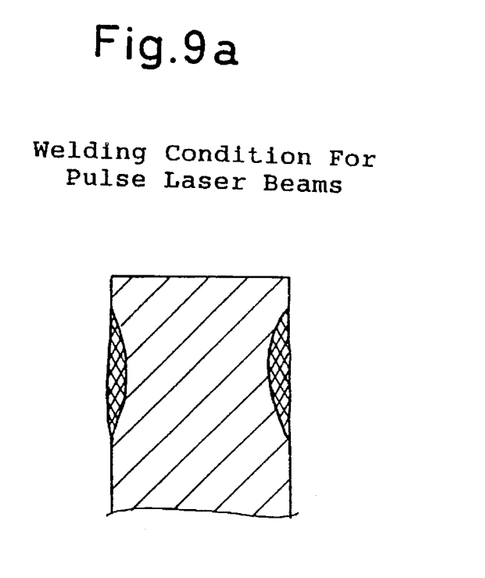
FIGS. 9a and 9b are views how welding portions of center electrodes are observed according to the first embodiment of the invention.

The operating condition of the pulse YAG laser employed herein is under 0.8 ms in pulse width, 12 PPS and 3.5 sec for duration. The welding condition under this operating condition is shown at "PULSE" in FIG. 9a.

Figure 9B:
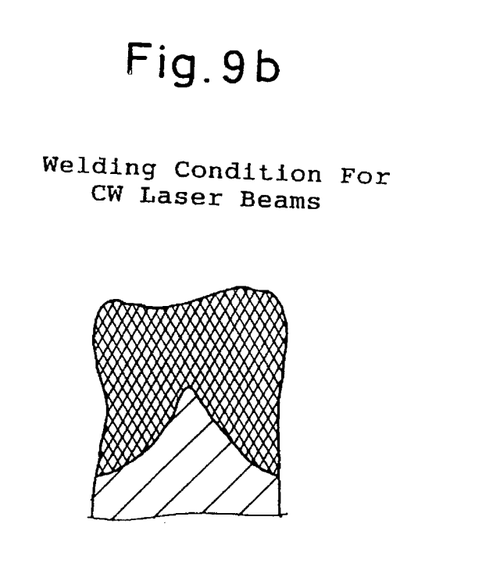

When CW laser (Continuous-Wave Gas Laser) is used, the electrode metal (a) is subjected to a considerable amount of heat too much to put it into practical use as shown at "CW" in FIG. 9b. This is because it is necessary to apply the laser beams 6 until the wire (b) begins to melt although a melting point of the wire (b) is higher than that of the electrode metal (a).

The wire (b) is fused into the electrode metal (a) to circularly form a Pt-Ni alloyed layer. The welding operation is carried out in a chamber 36 into which a stream of argon gas is flowing. The welding portion is placed in inert argon atmosphere which prevents oxidation of the welding portion. An exhaust duct 37 is provided to prevent the protective glass 5 from being stained by metallic vapor.

It is to be noted that Pt-containing rate of the Pt-Ni alloyed layer changes depending on an intensity of the laser energy level applied on the welding portion. It is preferable that the Pt- containing rate may be 70–90% at the middle of the alloyed layer so as to enhance a spark-erosion resistant property of the center electrode for the spark plug.

A durability experimental test was carried out with the spark plug mounted on four-cylinder, 1600 cc engine at full load (5500 rpm). As a result of the durability experimental test, FIG. 3 is a graph showing a relationship between durability time and increase of spark gap.

Figure 4:
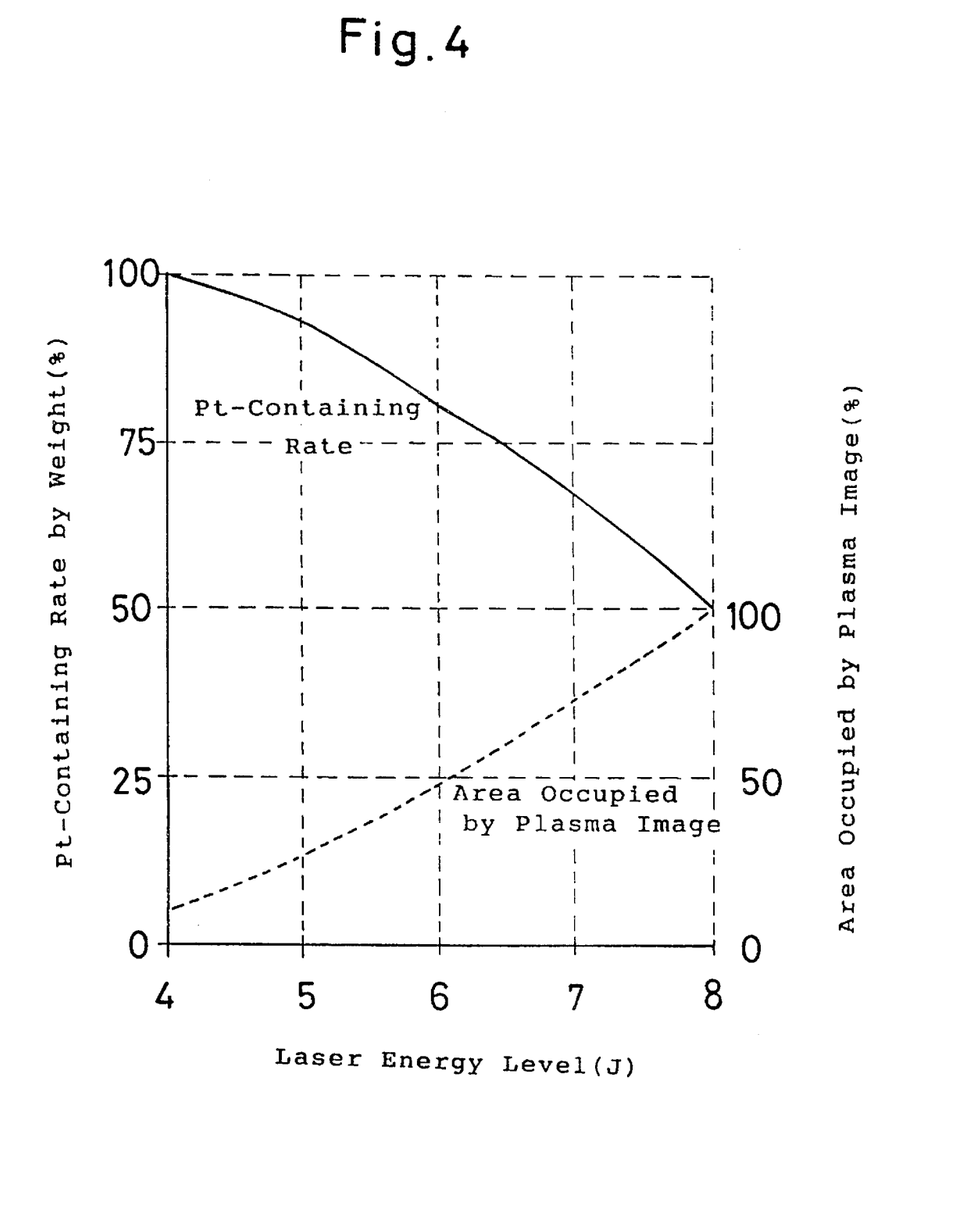
FIG. 4 is a graph showing a relationship between Pt-containg rate and area of plasma image.

FIG. 4 is a graph showing a relationship between the Pt-containing rate and an area of the plasma image photographed at various laser energy levels.

Figure 3:
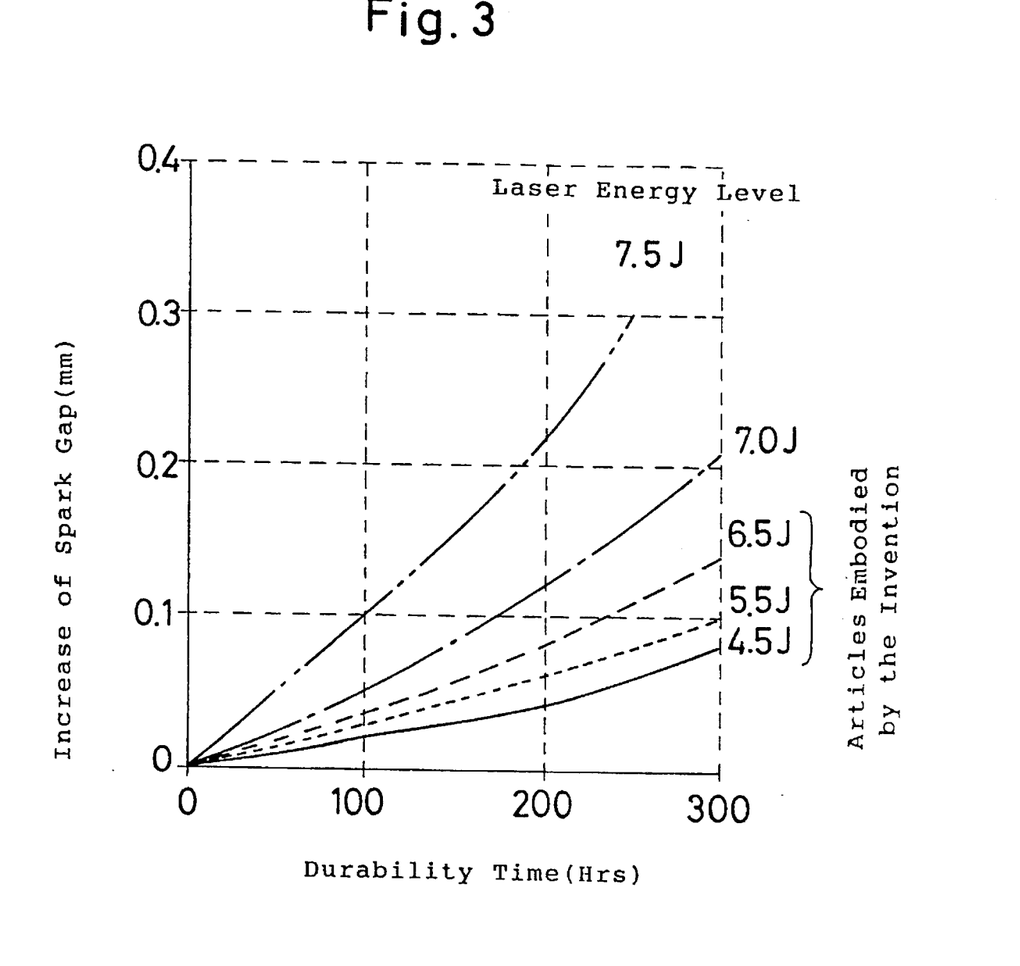
FIG. 3 is a graph showing a relationship between durability time and increase of a spark gap when a durability experimental test is carried out with a spark plug mounted on a gasoline engine according to the first embodiment of the invention.

From FIGS. 3 and 4, it is found that the Pt-containing rate in less than 70% tends to increase the spark erosion so as to remarkably increase the spark gap in which the Pt-Ni alloyed layer has increased its volume so that the Pt-containing rate has decreased.

When the Pt-containing rate exceeds 90% at the time of welding operation, an unfused portion often remains at an interface between the Pt-Ni alloyed layer and the electrode metal (a). This also causes to fall the alloyed layer off due to the expansional difference between the alloyed layer and the electrode metal (a) when put into practical use by mounting the spark plug on the engine.

Figure 5:
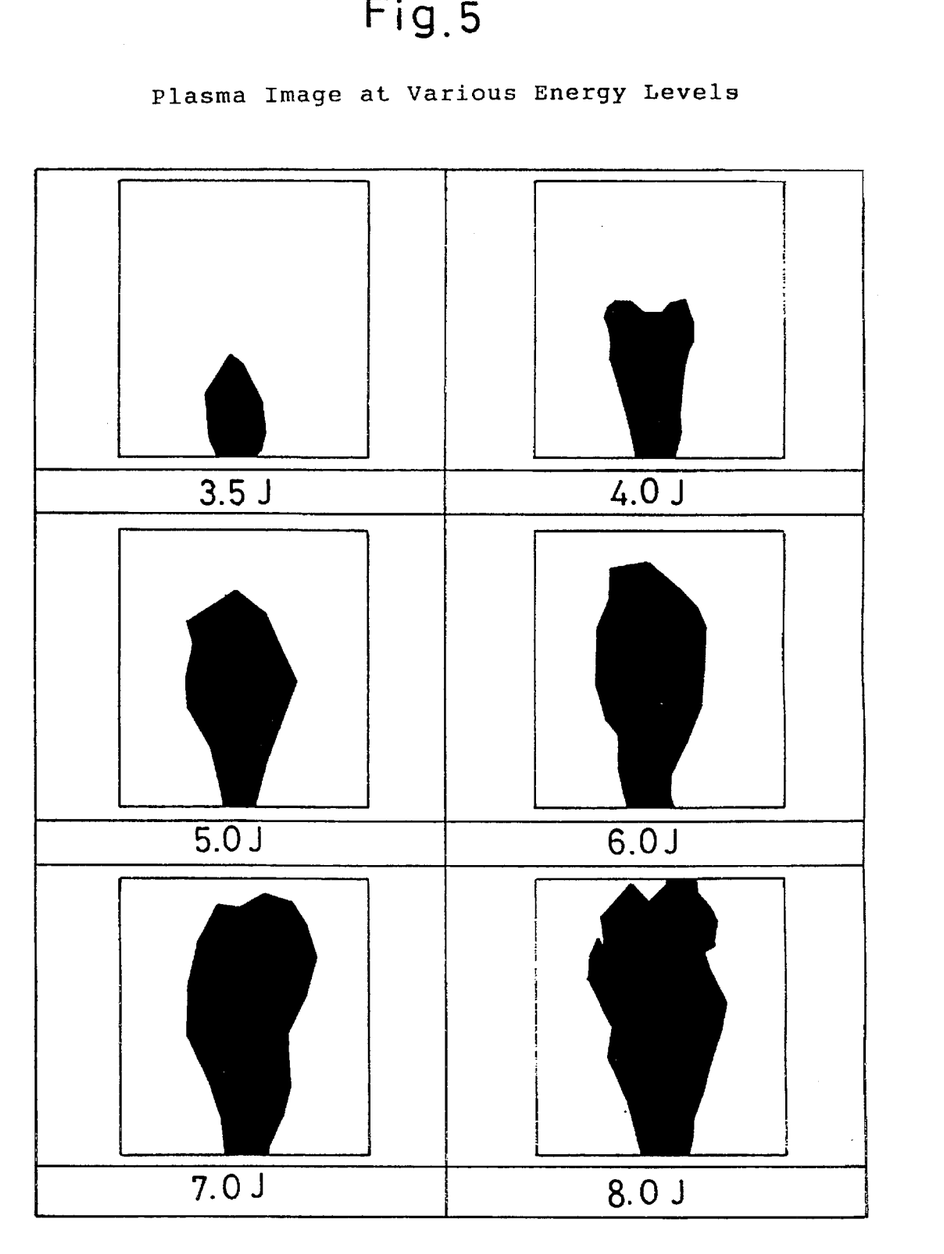
FIG. 5 show some plasma images photographed at various laser energy levels by CCD camera.

FIG. 5 are plasma images photographed by the CCD camera at various laser energy levels. It is found from FIGS. 4 and 5 that the increase of the laser energy level brings a decrease of the Pt-containing rate while increasing the area of the plasma image. This means that the Pt-containing rate is controlled by monitoring the area of the plasma image photographed.

Figure 6:
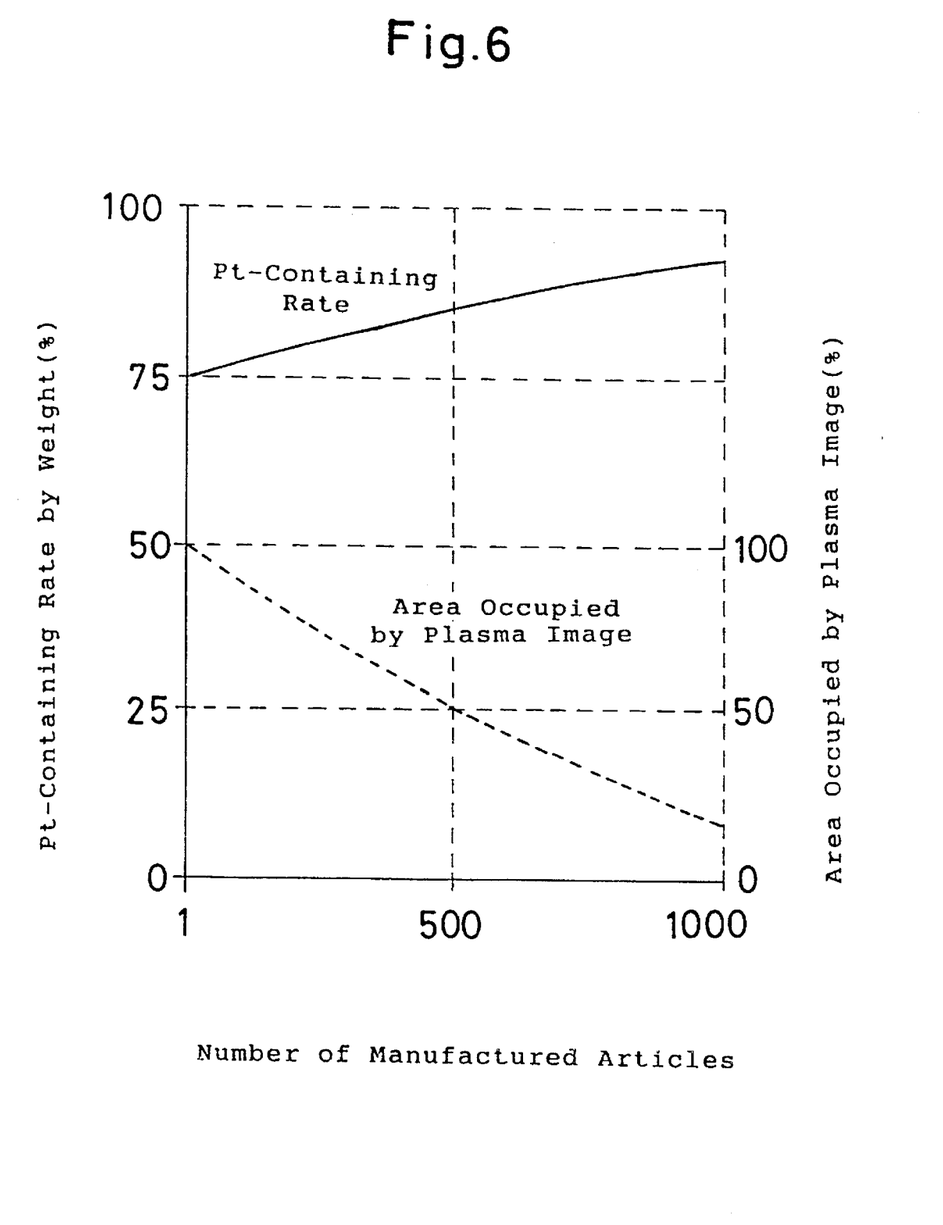
FIG. 6 is a graph showing a relationship between Pt-containg rate and area of plasma image taken when a protective glass is clouded.

FIG. 6 is a graph showing a relationship between the Pt-containing rate, the number of products and an area of the plasma image photographed when the exhaust duct 37 is not activated. When the exhaust duct 37 is not operated, metallic vapor appeared at the time of applying the laser beams deposits on the protective glass 5 so as to decrease the laser energy density applied on the welding portion. This causes the Pt-containing rate to deviate from the allowable value, but detectable due to the gradually decreased area of the plasma image.

Figure 7:
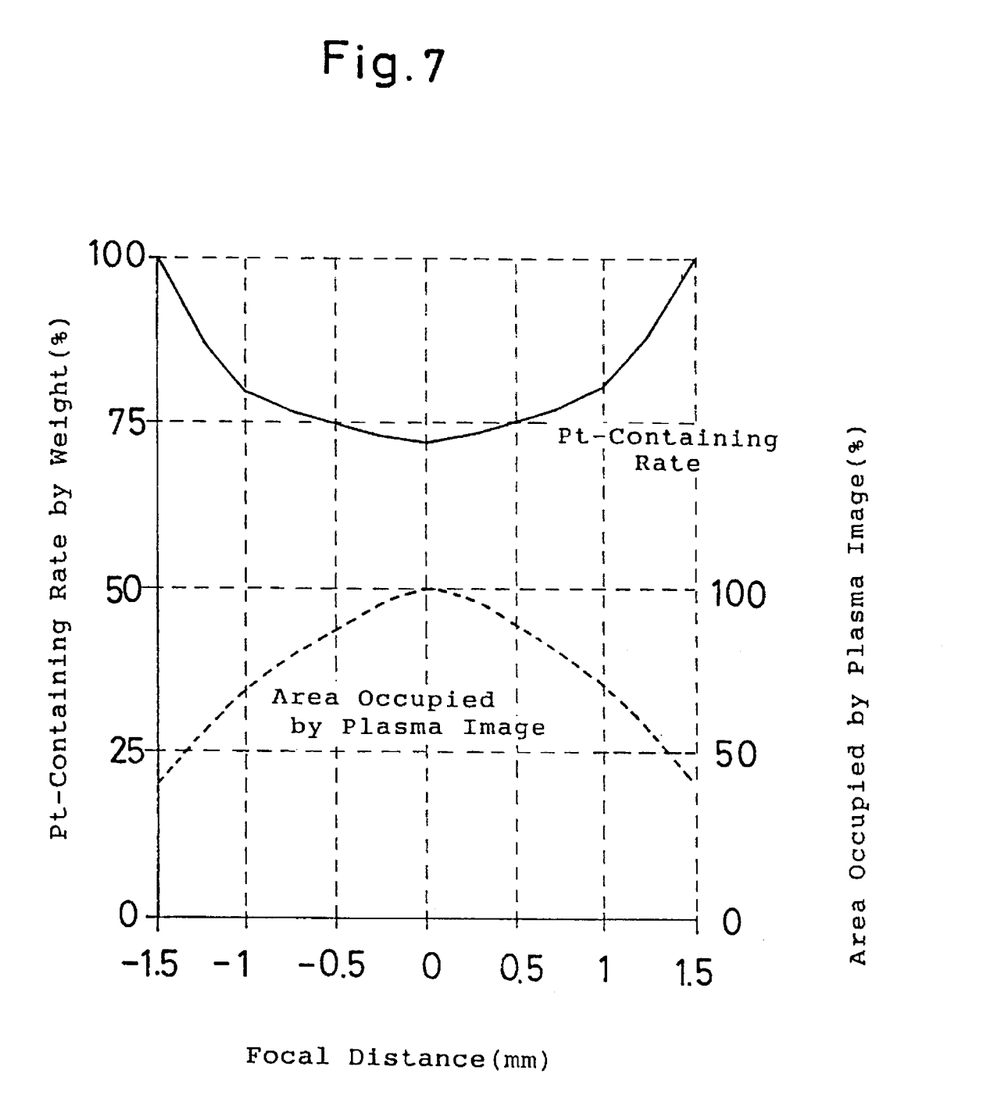
FIG. 7 is a graph showing a relationship between Pt-containg rate and area of plasma image taken while changing a distance from an object to a light-converging lens.

FIG. 7 is a graph showing a relationship between the Pt-containing rate and an area of the plasma image photographed when changing a distance from the object to the light-converging lens. On the assumption that the light-converging lenses 3, 4 concentrate the laser beams 6 into spot beams which are applied on the welding portion, the welding is insufficient due to the reduced density of the laser energy level when the focuses of the light-converging lenses 3, 4 are too near or too far. When the Pt-containing rate from the allowable value, it is found that the area of the plasma image decreases.

Figure 8:
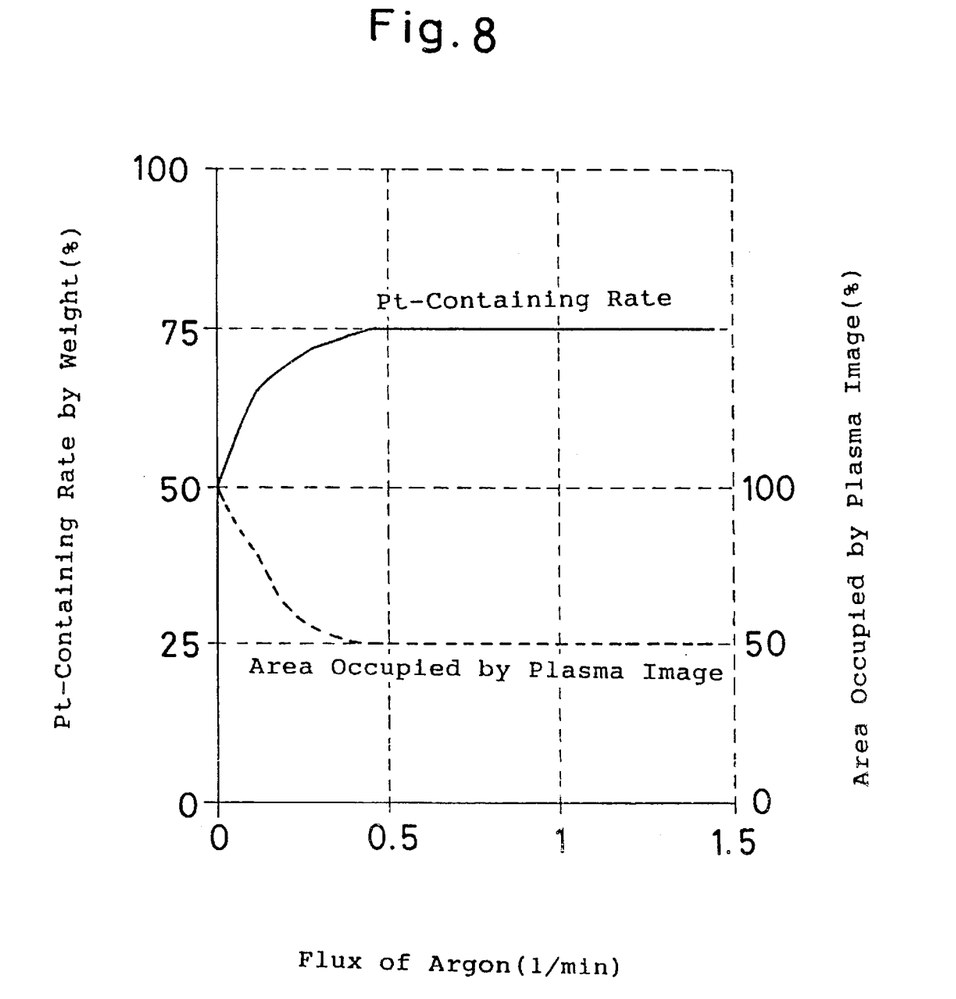
FIG. 8 is a graph showing a relationship between Pt-containg rate and area of plasma image taken while changing flux of argon gas.

FIG. 8 is a graph showing a relationship between the Pt-containing rate and an area of the plasma image photographed when changing the flux of the argon gas flowing into the chamber 36. When the argon gas is not flowing normally, it is found that the Pt-containing rate decreases because the electrode metal (a) is facilitated to melt due to the generated oxidation heat. In this instance, it is possible to detect the abnormal welding due to the enlarged area of the plasma image photographed.

As a result with the experimental test, it is possible to recognize the welding condition of the product by measuring the area of the plasma image so as to check whether the product has a good welding portion or not by comparing the measurement value with the allowable value.

In the case in which the welding condition is determined by a height of the plasma image photographed, the same procedure is applied as used when determined by the area of the plasma image. Further, it is possible to decrease the variation of the measurement values to obtain a stable check and maintenance by determining the welding condition by both the area and the height of the plasma image photographed.

In the present embodiment of the invention, the CCD camera 31 is located on which only the plasma image is photographed. This is because the CCD camera 31 is not exposed to the scattered light of the laser beams 6 applied on the welding portion so as to improve the measurement precision. A filter may be used to block infrared-rays when the CCD camera 31 is placed in a manner to be exposed to the scattered light of the laser beams 6 applied on the welding portion.

It is appreciated that the laser device is used at the time of cutting, broaching and scribing.

It is also appreciated that instead of the CCD camera, SIT tube (Silicon Intensifier Target Tube) may be used as an image pick-up tube, and CO2 laser, or excimer laser (Excited Dimer) may be used instead of the YAG laser.

Figure 10:
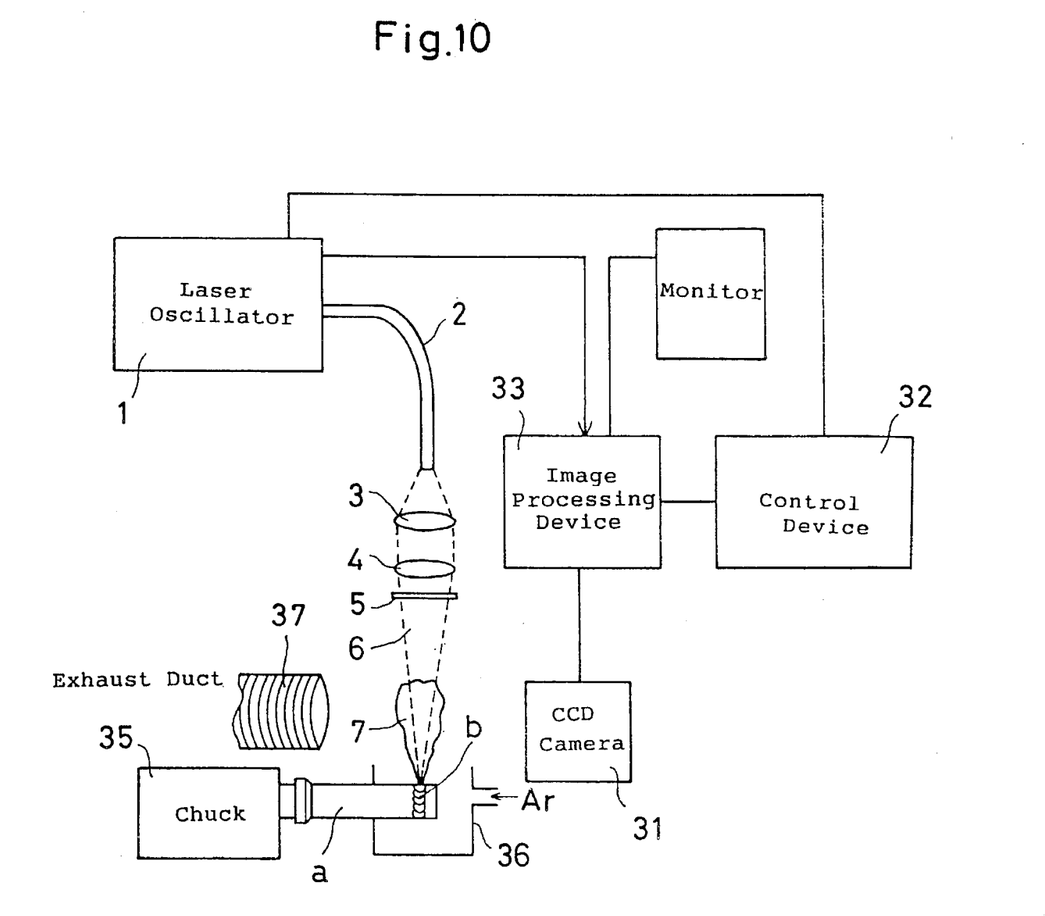
FIG. 10 is a schematic view of a welding device according to a second embodiment of the invention.

FIG. 10 shows a second embodiment of the invention which is substantially the same as the first embodiment of the invention except for a control device 32 provided instead of the distinction device 34.

The control device 32 enables to control the laser energy level generated from the laser oscillator 1 depending on the difference between the allowable value and the measurement value generated from the image processing device 33. This makes it possible to maintain the welding condition substantially uniform without inviting any welding defect.

It is possible to reduce the variation of the welding so as to make the quality of the welding uniform by narrowing a control width of the control device 32. This contributes to stable performance of individual products.

Figure 11:
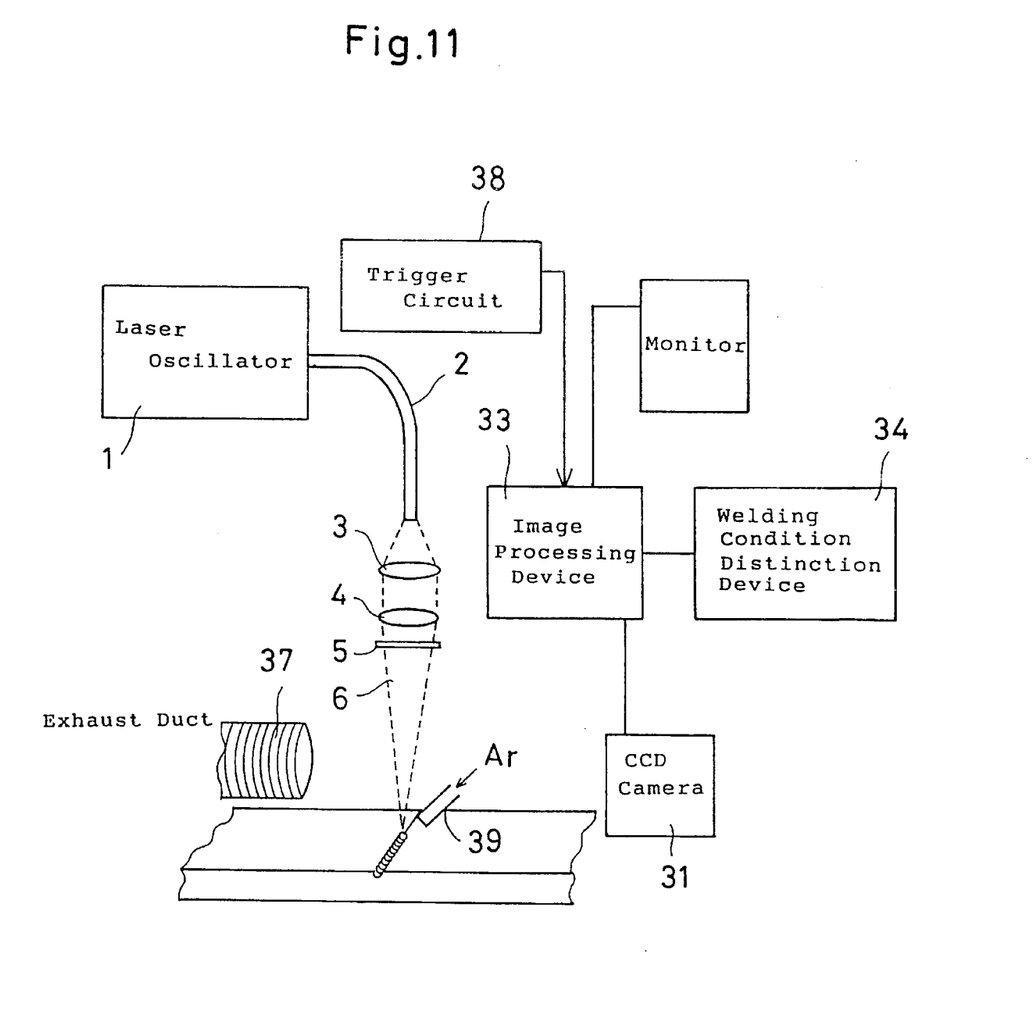
FIG. 11 is a schematic view of a welding device according to a third embodiment of the invention.

FIG. 11 shows a third embodiment of the invention in which the CW laser is used to bond flat plates by means of a butt welding. The third embodiment of the invention is substantially the same as the first embodiment of the invention except for the trigger signal source 38 discretely provided so that the plasma 7 is photographed by the photographing device 31. In this instance, the inert argon gas is to be replenished by an assist gas applicator 39.

While the invention has been described with reference to the specific embodiment, it is understood that this description is not to be construed in a limiting sense in as much as various modifications and additions to the specific embodiment may be made by skilled artisans without departing from the spirit and scope of the invention.

What is claimed is:

1. A laser welding device comprising:

a photographing member provided to photograph plasma caused by exposing laser beams to an object;

an image processing member provided to measure at least one of an area and height of a plasma image photographed by the photographing member; and a distinction member provided to compare a value measured by the image processing member with an allowable value so as to determine the quality of laser welding condition.

2. A laser welding device comprising:

a photographing member provided to photograph plasma caused by irradiating laser beams to an object;

an image processing member provided to measure at least one of an area and height of a plasma image photographed by the photographing member; and a control member provided to control an energy level of laser beams generated by a laser oscillator depending on a difference between a value measured by the image processing member and an allowable value.

3. A method of checking laser welding condition comprising the steps of photographing plasma caused by exposing laser beams to an object, and measuring at least one of an area and height of a plasma image so as to determine the quality of the laser welding condition.

4. A method of making a center electrode for a spark plug when bonding a noble metal portion by pulse laser welding, comprising the steps of photographing plasma caused by exposing laser beams to an object, and measuring at least one of an area and height of a plasma image so as to determine whether the laser welding condition is good or not.

* * * * *